(12) United States Patent
Pawar et al.

(10) Patent No.: US 10,356,776 B1
(45) Date of Patent: Jul. 16, 2019

(54) DYNAMIC DEPLOYMENT OF NEW FRAME CONFIGURATION

(71) Applicant: Sprint Spectrum LP, Overland Park, KS (US)

(72) Inventors: Hemanth Pawar, Brambleton, VA (US); Shilpa Kowdley, Brambleton, VA (US); Chunmei Liu, Great Falls, VA (US); Krishna Sitaram, Chantilly, VA (US)

(73) Assignee: Sprint Spectrum LP, Overland Park, KS (US)

( * ) Notice: Subject to any disclaimer, the term of this patent is extended or adjusted under 35 U.S.C. 154(b) by 0 days.

(21) Appl. No.: 15/465,627

(22) Filed: Mar. 22, 2017

(51) Int. Cl.
*H04W 72/04* (2009.01)
*H04W 72/12* (2009.01)

(52) U.S. Cl.
CPC ... *H04W 72/0426* (2013.01); *H04W 72/0406* (2013.01); *H04W 72/1278* (2013.01)

(58) Field of Classification Search
None
See application file for complete search history.

(56) References Cited

U.S. PATENT DOCUMENTS

| | | | | |
|---|---|---|---|---|
| 8,160,007 B2 * | 4/2012 | Wu | ...................... | H04W 72/085 370/329 |
| 8,411,646 B2 * | 4/2013 | Wu | ................... | H04W 72/1231 370/336 |
| 8,547,857 B2 * | 10/2013 | Wu | ...................... | H04W 72/082 370/252 |
| 8,705,556 B2 * | 4/2014 | Wang | ................ | H04W 72/0406 370/431 |
| 8,923,274 B2 * | 12/2014 | Wang | ........................ | H04L 1/08 370/351 |
| 9,066,262 B2 * | 6/2015 | Siomina | ................ | H04W 24/10 |
| 9,276,691 B2 | 3/2016 | Choi et al. | | |
| 9,374,811 B2 * | 6/2016 | Kim | ...................... | H04L 1/1822 |
| 9,385,856 B2 * | 7/2016 | Ji | ........................ | H04W 72/042 |
| 9,578,650 B2 * | 2/2017 | Wang | .................... | H04W 24/02 |
| 9,654,261 B2 * | 5/2017 | Lorca Hernando | ... | H04L 5/0032 |
| 9,825,741 B2 * | 11/2017 | Tabet | .................... | H04L 5/0073 |
| 9,860,903 B2 * | 1/2018 | Oh | ....................... | H04W 72/082 |
| 2007/0191041 A1 * | 8/2007 | Chapin | ............... | H04W 52/283 455/509 |
| 2012/0082038 A1 * | 4/2012 | Xu | ....................... | H04J 11/0023 370/244 |
| 2012/0207025 A1 * | 8/2012 | Barbieri | .............. | H04W 72/082 370/236 |
| 2014/0003270 A1 * | 1/2014 | Maltsev | ................ | H04W 52/34 370/252 |

(Continued)

*Primary Examiner* — Gregory B Sefcheck

(57) ABSTRACT

Interference caused between neighboring access nodes deploying wireless air-interface resources in different frame configurations while using the same frequency sub-band is mitigated by modifying the subframes deployed by a first access node by muting the subframes in the first frame configuration. Wireless resources from a different frequency sub-band can be aggregated towards the interfering subframes. A third access node adjacent to the first access node may deploy wireless resources in the first frame configuration and using the second frequency sub-band. A determination of how to reconfigure the interfering subframes is based on numbers of wireless devices in potential interference zones between each access node.

14 Claims, 11 Drawing Sheets

(56) References Cited

U.S. PATENT DOCUMENTS

| | | | |
|---|---|---|---|
| 2014/0146719 A1* | 5/2014 | Gao | H04J 3/1694 370/278 |
| 2016/0006529 A1* | 1/2016 | Yi | H04J 11/0056 370/329 |
| 2016/0119792 A1* | 4/2016 | Cheng | H04W 16/14 455/454 |
| 2016/0248563 A1* | 8/2016 | Behravan | H04L 5/0087 |
| 2016/0323889 A1* | 11/2016 | Jeon | H04W 72/0486 |
| 2016/0329993 A1* | 11/2016 | Kim | H04W 52/365 |
| 2017/0195099 A1* | 7/2017 | Kahtava | H04L 5/0053 |

* cited by examiner

DYNAMIC DEPLOYMENT OF NEW FRAME CONFIGURATION

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. Wireless air-interface resources deployed by access nodes, such as resource blocks, are typically allocated between uplink transmissions, i.e. transmissions from a wireless device to an access node, and downlink transmissions, i.e. transmissions from the access node to the wireless device. Further, wireless air-interface resources can be deployed in various combinations of uplink, downlink, and special subframes, i.e. a transmission time interval of the wireless network. A unique combination of different types of subframes may be bundled within a larger time interval, i.e. a frame interval, and is hereinafter referred to as a frame configuration. Each frame configuration comprises a different ratio of downlink and uplink subframes.

For various reasons, network operators may implement a different or "new" frame configuration within a wireless network that is currently utilizing an existing or "old" frame configuration. For example, increasing numbers of wireless devices connecting to various access nodes may necessitate increased downlink capacity within the wireless network, resulting in a decision to reconfigure the various access nodes within the wireless network to deploy wireless resources in a frame configuration with a relatively greater number of downlink subframes. However, during the process of implementing a new frame configuration within the wireless network, there exists a potential for interference caused between access nodes utilizing the new frame configuration and neighboring or adjacent access nodes utilizing the old frame configuration. For example, uplink subframes scheduled by an access node utilizing the old frame configuration can interfere with corresponding downlink subframes that are contemporaneously scheduled by a nearby access node utilizing the new frame configuration. The potential for interference is particularly high when both different types of subframes are deployed using the same frequency sub-band. Generally, there exists a potential for interference between two or more access nodes that deploy wireless resources in different frame configurations.

Overview

Exemplary embodiments described herein include systems, methods, and processing nodes for mitigating interference caused between neighboring access nodes deploying wireless air-interface resources in different frame configurations while using the same frequency sub-band, by modifying the subframes deployed by a first access node geographically positioned adjacent a second access node.

In an exemplary method, a method for frame reconfiguration in a wireless network includes determining that a first subframe of a first type scheduled to be deployed by a first access node in the wireless network can cause interference to a second subframe of a second type scheduled to be deployed by a second access node adjacent to the first access node, and reconfiguring the first subframe to minimize the interference.

In another exemplary embodiment, a system for frame reconfiguration in a wireless network includes a processing node, and a processor coupled to the processing node. The processor enables the processing node to perform operations including determining a first number of wireless devices located in a first interference zone between a first access node and a second access node. The first access node deploys a first primary carrier utilizing a first frequency sub-band and a first secondary carrier utilizing a second frequency sub-band and the second access node deploys at least a second primary carrier utilizing the second frequency sub-band. The operations further include determining a second number of wireless devices located in a second interference zone between the first access node and a third access node, wherein the third access node deploys at least a third primary carrier utilizing the first frequency sub-band, determining that the first number exceeds the second number, and aggregating resources from the first secondary carrier towards the first primary carrier.

In another exemplary embodiment, an exemplary processing node for frame reconfiguration in a wireless network is configured to perform operations including determining that an uplink subframe scheduled to be deployed by a first access node in the wireless network can cause interference to a downlink subframe scheduled to be deployed by a second access node adjacent to the first access node, and allocating minimal air-interface resources towards the uplink subframe.

In another exemplary embodiment, a method for frame reconfiguration in a wireless network includes, determining, for an access node geographically positioned between a plurality of neighboring access nodes, that a first neighboring access node deploys wireless resources using a first frequency sub-band that is shared with the access node, and instructing the access node to aggregate wireless resources from a second frequency sub-band towards a first one or more subframes scheduled to be deployed by the access node using the first frequency sub-band.

In another exemplary embodiment, a system for implementing a new frame configuration in a wireless network includes a first access node within the wireless network configured to deploy wireless resources in a first frame configuration, a second access node adjacent to the first access node configured to deploy wireless resources in a second frame configuration, and a processing node communicatively coupled to both first and second access nodes. The processing node is configured to determine that a portion of the wireless resources deployed by the first access node in the first frame configuration can interfere with a corresponding portion of the wireless resources deployed by the second access node in the second frame configuration, and reconfigure the portion of the wireless resources deployed by the first access node to minimize interference.

DETAILED DESCRIPTION

Figure 1:
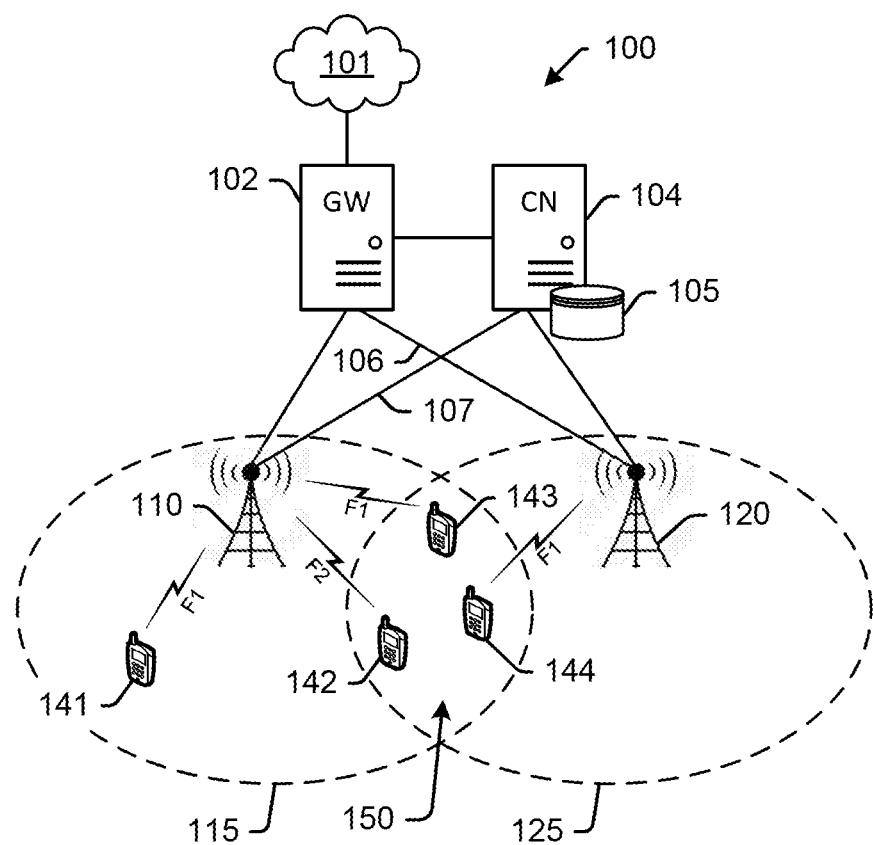
FIG. 1 depicts an exemplary system for modifying a frame configuration in a wireless network with at least two adjacent access nodes.

In embodiments disclosed herein, interference caused between neighboring access nodes deploying wireless air-interface resources in different frame configurations while using the same frequency sub-band is mitigated by modifying the subframes deployed by a first access node geographically positioned adjacent a second access node. The first access node is configured to deploy wireless air-interface resources, or subframes, in a first frame configuration comprising a first unique sequence of subframes within a frame interval. The second access node is configured to deploy wireless resources in a second frame configuration comprising a second unique sequence of subframes within the frame interval. For example, the first frame configuration may be an old frame configuration, and the second frame configuration may be a new frame configuration. In other words, the second access node has been configured to use the new frame configuration, while the first access node is still using the old frame configuration.

Further, each unique sequence comprises subframes of at least first and second types. For example, the first and second types of subframes include at least downlink subframes and uplink subframes. Therefore, a determination that a portion of the wireless resources deployed by the first access node in the first frame configuration can interfere with a corresponding portion of the wireless resources deployed by the second access node in the second frame configuration is based on a potential for interference when the first access node deploys an uplink subframe contemporaneously with the second access node deploying a downlink subframe, or vice versa, particularly when both first and second access nodes utilize the same frequency band or sub-band.

As described herein, once a potential for interference is determined, a first access node is instructed to reconfigure the portion of the wireless resources deployed therefrom to minimize interference. Exemplary embodiments disclosed herein describe reconfiguring the portion of the wireless resources deployed by the first access node by muting the one or more subframes in the first frame configuration. In other words, any allocation of wireless air-interface resources is removed from one or more subframes that may conflict with corresponding one or more subframes deployed by the second access node. For example, it is determined that an uplink subframe scheduled to be deployed by the first access node can interfere with a downlink subframe scheduled to be deployed by the second access node. In this case, allocations of data and/or control interface resources are removed from the uplink subframe.

Alternatively, or in addition, wireless resources from a different frequency band or sub-band can be aggregated towards the interfering portion of wireless resources. For example, the wireless resources deployed by the first access node in the first frame configuration may be deployed using a first frequency sub-band, and additional wireless resources deployed in the second frame configuration using a second frequency sub-band. In other words, the first access node deploys a primary carrier utilizing the first frequency sub-band and a secondary carrier utilizing the second frequency sub-band, and the second access node deploys a primary carrier utilizing the first and/or second frequency sub-bands. The first access node is configured to aggregate additional wireless resources in the second carrier into the first carrier, by aggregating the additional wireless resources into the one or more subframes scheduled to be deployed in the first frame configuration from one or more corresponding subframes scheduled to be deployed in the second frame configuration. For example, when an interfering subframe deployed by the first access node is an uplink subframe and the corresponding (i.e. contemporaneous) subframe deployed by the neighboring (second) access node comprises a downlink subframe, the uplink subframe is scheduled on a first frequency sub-band deployed by the first access node and resources from a second frequency sub-band deployed by the first access node are aggregated towards the interfering uplink subframe. This is feasible when wireless devices coupled to the first access node via the first frequency sub-band are capable of carrier aggregation. Moreover, any allocation of wireless resources from the first frequency sub-band can be removed from the interfering subframe(s).

In additional embodiments described herein, a third access node adjacent to the first access node (i.e. another neighboring access node) may also be using the old (i.e. first) frame configuration, similar to the first access node. Moreover, the third access node may deploy wireless resources in the first frame configuration and using the second frequency sub-band. Consequently, there is an additional potential for interference between wireless resources deployed by the first access node using the modified frame configuration as described above, and a corresponding portion of the wireless resources deployed by the third access node in the first frame configuration. In this case, a determination is made of how to reconfigure the portion of the wireless resources deployed by the first access node in order to minimize interference caused to either the second or third neighboring access nodes. For example, a first potential for interference is determined between the first and second access nodes, and a second potential for interference is determined between the first and third access nodes, and a decision of how to reconfigure the first access node is based on numbers of wireless devices in potential interference zones between each access node. In exemplary embodiments described herein, a determination is made of a first number of wireless devices located in a first interference zone between the first access node and the second access node and a second number of wireless devices located in a second interference zone between the first access node and the third access node. If the first number exceeds the second number, wireless resources from the second frequency sub-band are aggregated into the one or more subframes in the first frame configuration utilizing the first frequency sub-band. If the second number exceeds the first number, wireless resources are aggregated from the first frequency sub-band into the one or more corresponding subframes in the second frame configuration.

The operations disclosed herein may be performed by one or more of a serving access node, a controller node, or any other network node, alone or in any combination, as further described below with respect to the embodiments depicted in FIGS. 1-5.

FIG. 1 depicts an exemplary system 100 for modifying a frame configuration in a wireless network with at least two adjacent access nodes 110 and 120. System 100 comprises a communication network 101, gateway 102, controller node a data transmission frame (or simply "frame") is about 10 ms in duration and comprises 10 subframes, each of which is about 1 ms in duration. For example, a frame of 10 ms in duration may comprise a number of subframes of 1 ms in duration (i.e., TTIs), arranged in a sequence of uplink subframes and downlink subframes. In some embodiments, a special subframe may also be used, for instance, as a guard between an uplink subframe and a downlink subframe or for any other suitable purpose, as depicted in Table 1 below:

TABLE 1

| Frame Config. | Frame Configurations |||||||||| 
|---|---|---|---|---|---|---|---|---|---|---|
| | Subframe (SF0-SF9) |||||||||| 
| (FC1-FCn) | SF0 | SF1 | SF2 | SF3 | SF4 | SF5 | SF6 | SF7 | SF8 | SF9 |
| FC0 | D | S | U | U | U | D | S | U | U | U |
| FC1 | D | S | U | U | D | D | S | U | U | D |
| FC2 | D | S | U | D | D | D | S | U | D | D |
| FC3 | D | S | U | U | U | D | D | D | D | D |
| FC4 | D | S | U | U | D | D | D | D | D | D |
| FC5 | D | S | U | D | D | D | D | D | D | D |
| FC6 | D | S | U | U | U | D | S | U | U | D |
| ... | | | | | ... | | | | | |
| FCn | D | S | U | F | F | D | S/D | F | F | F |

104, access nodes 110 and 120, and end-user wireless devices 141, 142, 143, and 144. Access node 110 is illustrated as having a coverage area 115 and access node 120 is illustrate as having a coverage area 125. Wireless devices 141, 142, and 143 are illustrated as being located within coverage area 115 and accessing network services directly from access node 110. For example, wireless devices 141 and 143 may communicate with access node 110 using a first frequency sub-band F1, and wireless device 142 may communicate with access node 110 using a second frequency sub-band F2. Further, wireless device 143 is illustrated as being located within coverage area 125 and accessing network services directly from access node 120 using, for instance, the first frequency sub-band F1.

Moreover, wireless devices 142, 143, and 144 are located in a potential interference zone 150 comprising an area where both coverage areas 115 and 125 overlap. As a consequence, if access node 110 is configured to deploy wireless air-interface resources (or subframes) in a frame configuration that is different from a frame configuration of wireless air-interface resources deployed by access node 120, then there may be interference caused to wireless devices 143, 144 that share the same frequency sub-band F1. Therefore, a determination that a portion of the wireless resources deployed by access node 110 in the first frame configuration can interfere with a corresponding portion of the wireless resources deployed by access node 120 in the second frame configuration may be based on access node 110 deploying an uplink subframe contemporaneously with access node 120 deploying a downlink subframe or vice versa. Further, the potential for interference may be based on a number of wireless devices in potential interference zone 150 meeting or exceeding a threshold.

Generally, each frame configuration comprises a unique sequence of subframes of different types within a frame interval. For example, in a time division duplex (TDD) network, the system bandwidth is shared between uplink and downlink, with the sharing being performed by allotting different periods of time (e.g. transmission time intervals or TTIs) to uplink and downlink transmission. In LTE systems, Each frame configuration in Table 1 comprises 10 subframes SF0-SF9, and each frame configuration FC0-FCn comprises a different ratio of downlink (D), uplink (U), and special (S) subframes. Other frame configurations may comprise various other sequences of special, downlink, and uplink subframes. LTE standards have prescribed seven known frame configurations (FC0-FC6 in Table 1) that can be selected from at any time by a network node, such as an access node or controller node. In other embodiments, such as in an enhanced interference mitigation and traffic adaptation (eIMTA) system within an LTE network, a frame configuration may comprise one or more flexible subframes that can be dynamically adjusted to either be downlink, uplink, or special subframes. See, for instance, configuration FCn with flexible subframes (F) in Table 1. When using a TDD frame structure, an uplink subframe and a downlink subframe may be transmitted over the same frequency at different times. Moreover, different frame configurations comprise different ratios of uplink subframes and/or downlink subframes. For the purposes of the subject disclosure, a frame configuration is not limited to existing known frame configurations, but can be any sequence of uplink and downlink subframes that can be appreciated by those having ordinary skill in the art in light of this disclosure.

Moreover, access node 110 may be configured to deploy wireless resources in FC1 (as shown in Table 1 above) and access node 120 may be configured to deploy wireless resources in FC2. FC1 may be an old frame configuration, FC2 may be a new frame configuration that is implemented in system 100 to increase the amount of downlink resources in the wireless network. Consequently, until access node 110 is reconfigured to deploy FC2, there exists a potential for interference between the different types of subframes that are contemporaneously-transmitted by each of access nodes 110 and 120, as described above. Upon determining such a potential for interference, access node 110 can be instructed to reconfigure the portion of the wireless resources deployed therefrom to minimize interference.

For example, the portion of the wireless resources deployed by access node 110 in the first frame configuration may be muted, i.e. any allocation of wireless air-interface resources is removed from the one or more subframes that may conflict with corresponding one or more subframes deployed by access node 120 in the second frame configuration. For example, it is determined that uplink subframes SF3 and SF8 in FC1 are scheduled to be deployed by access node 110 contemporaneously with downlink subframes SF3 and SF8 in FC2 scheduled to be deployed by access node 120. In this case, data and/or control interface resources are minimally-allocated or not allocated towards the uplink subframes, effectively blanking or muting these subframes, thereby minimizing any interference between the two different types of subframes.

Alternatively, or in addition, access node 110 can be configured to enable carrier aggregation and aggregate wireless resources from frequency sub-band F2 towards the interfering subframes deployed using frequency sub-band F1. For example, access node 110 may be configured to deploy wireless resources in the first frame configuration (FC1) using frequency sub-band F1 as a primary carrier, and additional wireless resources in the second frame configuration (FC2) using frequency sub-band F2 as a secondary carrier. Meanwhile, access node 120 is configured to deploy wireless resources in the second frame configuration (FC2) in both primary and secondary carriers (i.e. utilizing both frequency sub-bands F1 and F2). The potential for interference between uplink subframes (in FC1) deployed by access node 110 using frequency sub-band F1 and downlink subframes (in FC2) deployed by access node 120 using the same frequency sub-band can be minimized by instructing access node 110 to aggregate wireless resources from downlink subframes in frequency sub-band F2 towards the uplink subframes in frequency sub-band F1. In other words, access node 110 is configured to aggregate non-interfering resources towards the interfering resources, and to blank the interfering resources as described above. For example, when an uplink subframe deployed by access node 110 (on frequency sub-band F1) can potentially interfere with a corresponding downlink subframe deployed by access node 120 (also on frequency sub-band F1), access node 110 is configured to mute the uplink subframe and to aggregate resources from a corresponding downlink subframe (on frequency sub-band F2) towards the same time slot as the interfering uplink subframe. As will be evident to those having ordinary skill in the art, in light of this disclosure, such aggregation is feasible when wireless device 143 (attached to access node 110 via frequency sub-band F1) is capable of carrier aggregation.

Figure 6:
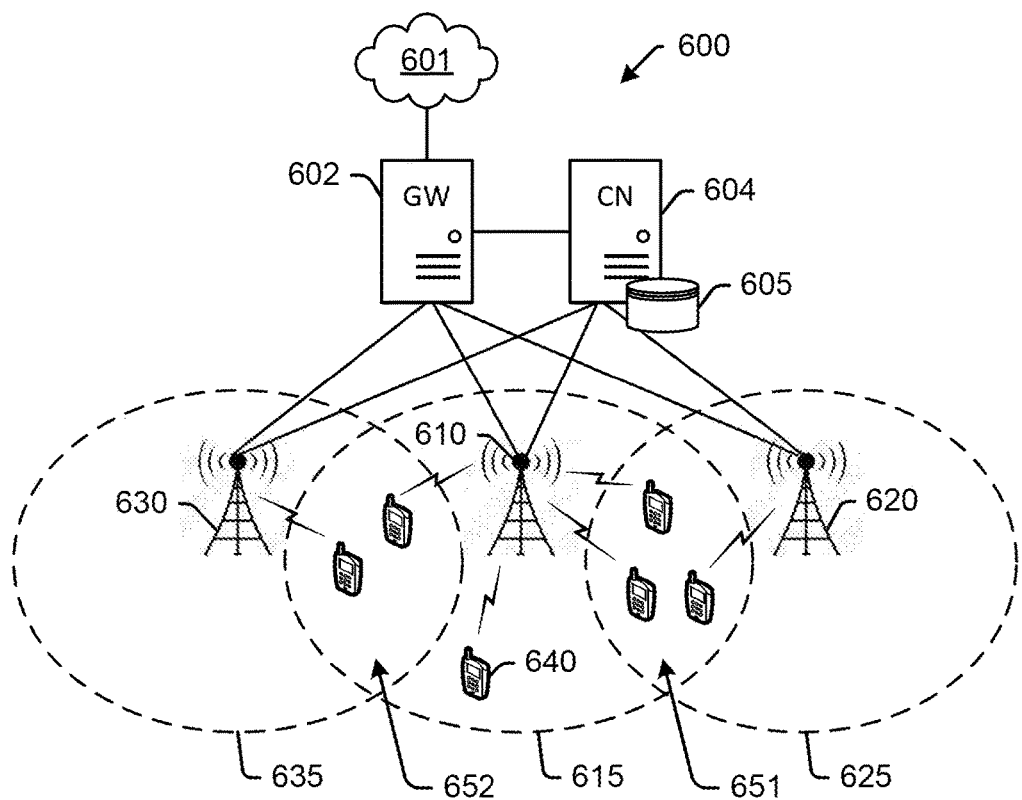
FIG. 6 depicts an exemplary system for modifying a frame configuration in a wireless network with at least three adjacent access nodes.

Access nodes 110, 120 can be any network node configured to provide communication between end-user wireless devices 141-144 and communication network 101, including standard access nodes and/or short range, low power, small access nodes. For instance, access nodes 110, 120 may include any standard access node, such as a macrocell access node, base transceiver station, a radio base station, an eNodeB device, an enhanced eNodeB device, or the like. In an exemplary embodiment, a macrocell access node can have a coverage area 115, 125 in the range of approximately five kilometers to thirty-five kilometers and an output power in the tens of watts. In other embodiments, access nodes 110, 120 can be a small access node including a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100. For example, system 600 in FIG. 6 depicts three adjacent access nodes.

Access nodes 110, 120 can comprise processors and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can each receive instructions and other input at a user interface. Access nodes 110, 120 communicate with gateway node 102 and controller node 104 via communication links 106, 107. Access nodes 110, 120 may communicate with other access nodes (not shown) using a direct link such as an X2 link or similar.

Wireless devices 141-144 may be any device, system, combination of devices, or other such communication platform capable of communicating wirelessly with access nodes 110, 120 using one or more frequency sub-bands deployed therefrom, such as F1 and F2. Each of wireless devices 141-144 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 141-144. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing wireless device capabilities of wireless devices 141-144 such as carrier-aggregation capabilities, locations thereof, frame configurations of access nodes 110, 120, as well as predefined or dynamic thresholds and associations thereof with frame configurations, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

Figure 2:
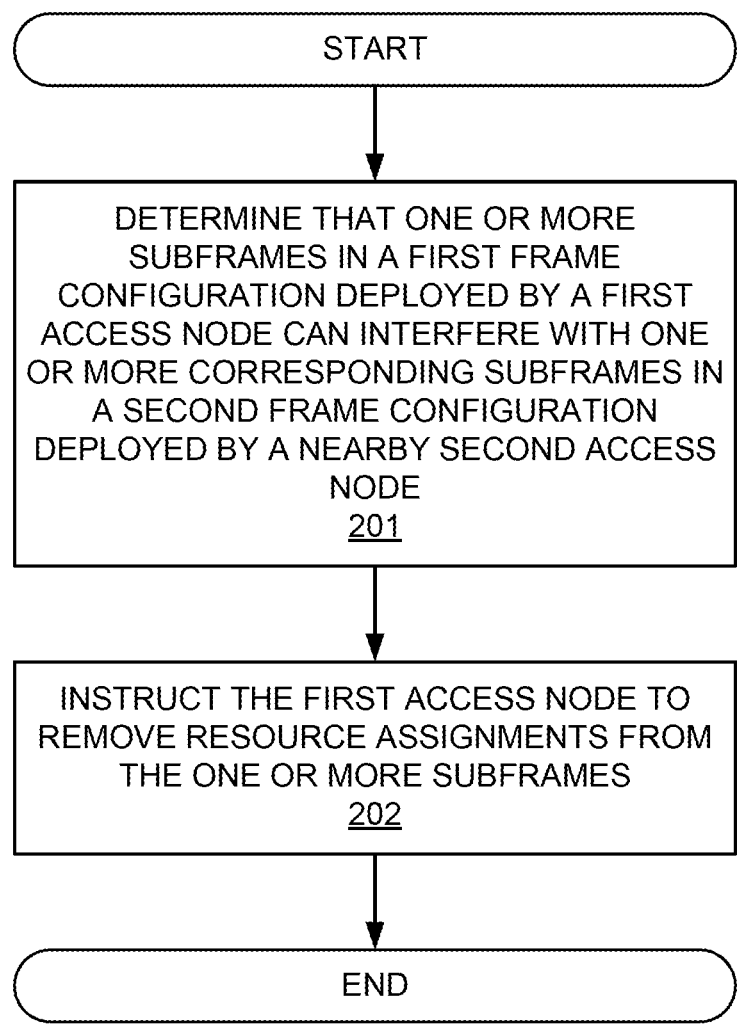
FIG. 2 depicts an exemplary method for modifying a frame configuration in a wireless network using subframe blanking.

FIG. 2 depicts an exemplary method for modifying a frame configuration in a wireless network using subframe blanking. The method of FIG. 2 may be implemented by an access node, such as one or more of access nodes 110, 120 in FIG. 1, controller node 104, or any other network node. Although FIG. 2 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The method begins at 201 with a determination that one or more subframes in a first frame configuration deployed by a first access node can interfere with one or more corresponding (i.e. contemporaneously-deployed) subframes in a second frame configuration deployed by a nearby second access node. For example, as described above, a first access node is configured to deploy wireless air-interface resources, or subframes, in a first frame configuration comprising a first unique sequence of subframes within a frame interval. The second access node is configured to deploy wireless resources in a second frame configuration comprising a second unique sequence of subframes within the frame interval. Each unique sequence comprises subframes of at least first and second types. For example, the first and second types of subframes include downlink subframes and uplink subframes. Therefore, a determination of a potential interference can be based on the first access node deploying an interfering uplink subframe contemporaneously with the second access node deploying a downlink subframe, or vice versa, particularly when both first and second access nodes utilize the same frequency band or sub-band.

At 202, the first access node is instructed to remove resource assignments from the one or more interfering subframes, effectively blanking or muting said one or more subframes. For example, as described herein, any allocation of wireless air-interface resources is removed from one or more subframes that may conflict (i.e. interfere) with corresponding one or more subframes deployed by the second access node. For example, it is determined that an uplink subframe scheduled to be deployed by the first access node can interfere with a downlink subframe scheduled to be deployed by the second access node. In this case, data and/or control interface resources are minimally-allocated or not allocated towards the interfering uplink subframe.

Figure 3:
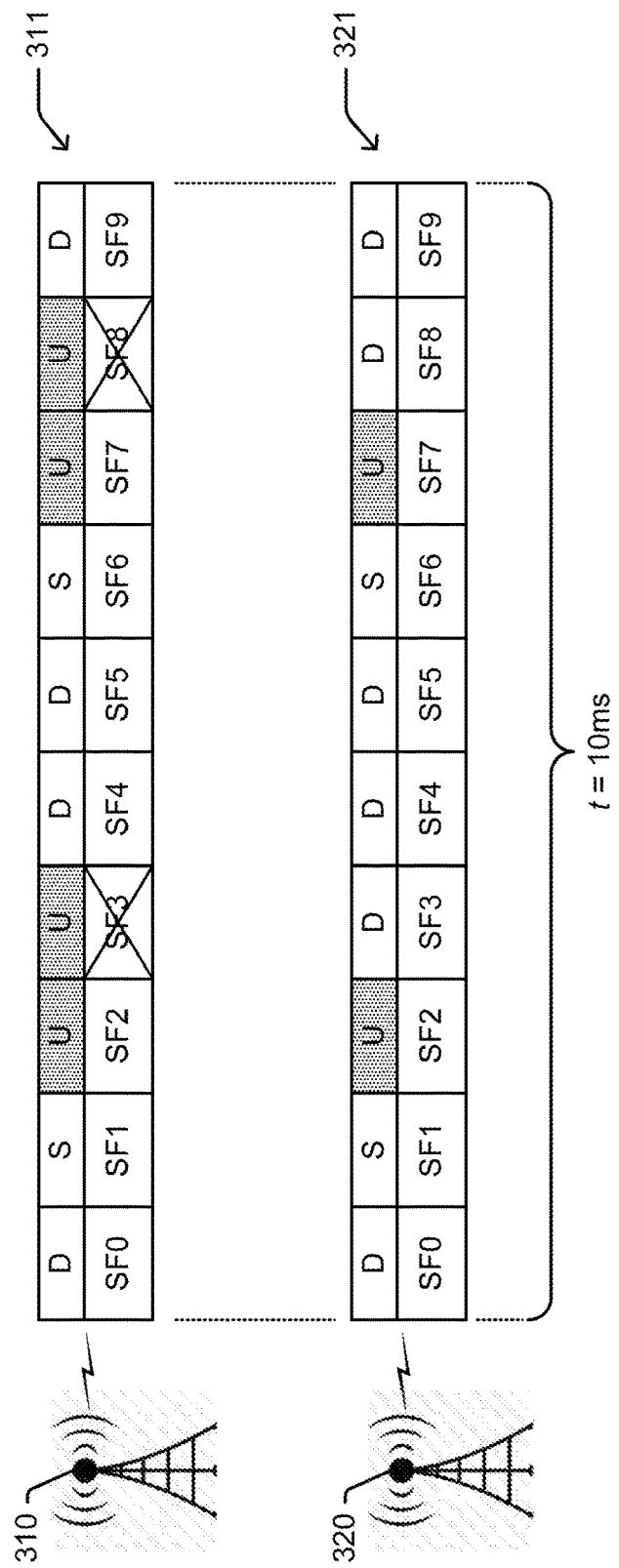
FIG. 3 depicts exemplary frame configurations deployed with subframe blanking.

FIG. 3 depicts exemplary frame configurations deployed with subframe blanking. As described herein, each frame configuration 311 and 321 is one of a plurality of frame configurations, and each frame configuration comprises a data frame having a sequence of uplink and downlink subframes in a specified ratio for a fixed time interval, along with one or more special subframes. A first access node 310 is configured to deploy wireless air-interface resources in a first frame configuration 311 comprising a first unique sequence of subframes SF0-SF9 within a frame interval of t=10 ms. A second access node 320 is configured to deploy wireless air-interface resources in a second frame configuration 321 comprising a second unique sequence of subframes SF0-SF9 within a frame interval of t=10 ms. It will be appreciated that first frame configuration 311 corresponds to FC1 in Table 1 above, and second frame configuration 321 corresponds to FC2. For any number of reasons, a frame configuration may be selected that has a different ratio of uplink subframes relative to downlink subframes than a frame configuration currently being used in the wireless network. For example, a network operator may configure access node 320 to utilize frame configuration 321 that comprises more downlink subframes relative to uplink subframes than an existing frame configuration 311 utilized by access node 310, so that relatively greater downlink resources are available within the network. In other embodiments, the selected frame configuration comprises fewer downlink subframes relative to uplink subframes than the current frame configuration, for instance if the network operator decides to revert to the original frame configuration at a later time.

Since the "new" frame configuration 321 comprises downlink subframes SF3 and SF8 that are of a different type than the contemporaneously-scheduled uplink subframes SF3 and SF8 in the "old" frame configuration 311, there exists a potential for interference for transmissions to/from wireless devices attached to either of access nodes 310 and 320 and utilizing the same frequency sub-band. To minimize any potential interference, access node 310 is instructed to remove resource assignments from subframes SF3 and SF8, effectively blanking or muting said subframes. For example, as described herein, any allocation of wireless air-interface resources is removed from uplink subframes SF3 and SF8 that may conflict with corresponding downlink subframes SF3 and SF8 deployed by access node 320 in frame configuration 321. Data and/or control interface resources are minimally-allocated or not allocated towards uplink subframes SF3 and SF8. Consequently, the potential for interference is minimized.

Figure 4:
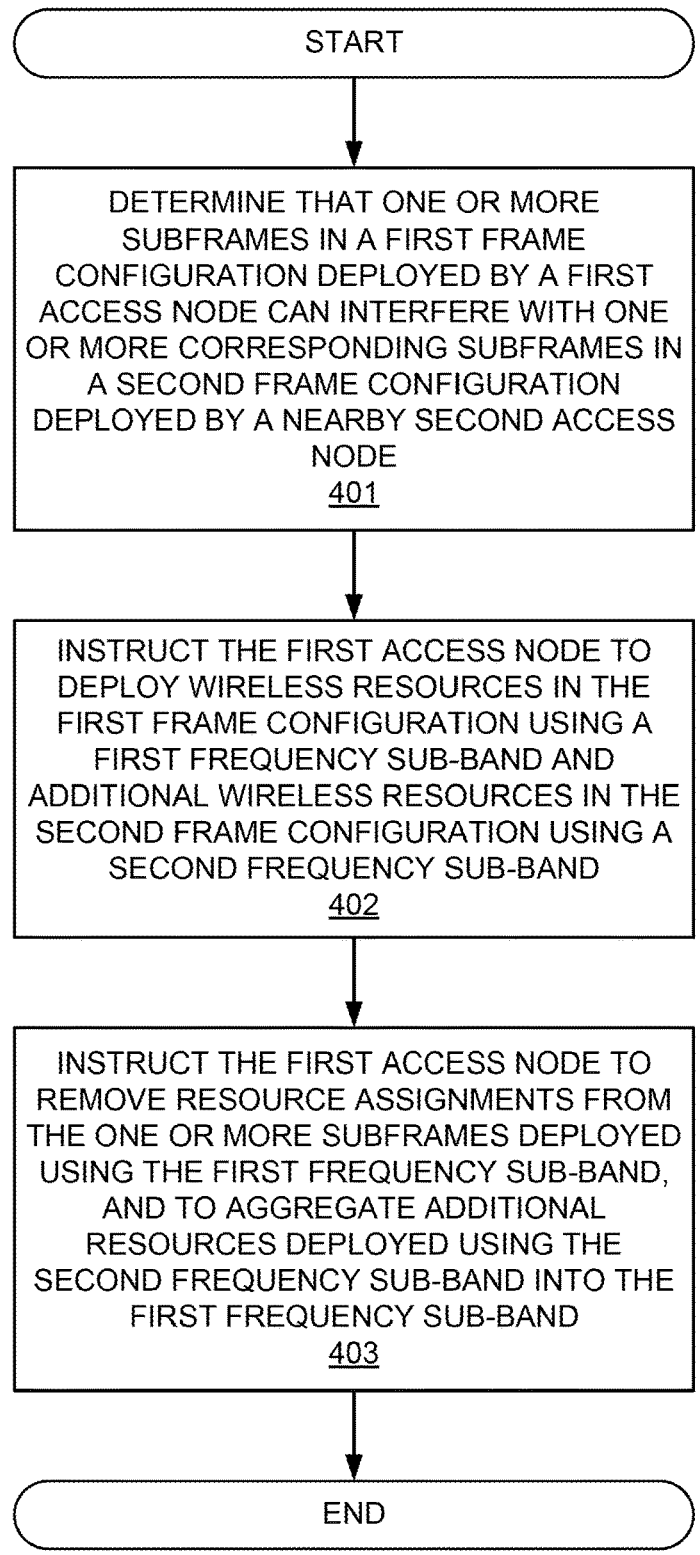
FIG. 4 depicts an exemplary method for modifying a frame configuration in a wireless network using carrier aggregation.

FIG. 4 depicts an exemplary method for modifying a frame configuration in a wireless network using carrier aggregation. The method of FIG. 4 may be implemented by an access node, such as one or more of access nodes 110, 120 in FIG. 1, controller node 104, or any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The method begins, at 401, with a determination that one or more subframes in a first frame configuration deployed by a first access node can interfere with one or more corresponding subframes in a second frame configuration deployed by a nearby second access node. For example, as described above, a first access node is configured to deploy wireless air-interface resources, or subframes, in a first frame configuration comprising a first unique sequence of subframes within a frame interval. The second access node is configured to deploy wireless resources in a second frame configuration comprising a second unique sequence of subframes within the frame interval. Each unique sequence comprises subframes of at least first and second types. For example, the first and second types of subframes include downlink subframes and uplink subframes, and the first frame configuration may comprise an uplink-biased frame configuration (such as FC1 shown in Table 1 above) and the second frame configuration may comprise a downlink-biased frame configuration (such as FC2), wherein the uplink-biased frame configuration comprises a greater ratio of uplink subframes relative to downlink subframes than the downlink-biased frame configuration. Therefore, a determination of a potential interference can be based on the first access node deploying an uplink subframe contemporaneously with the second access node deploying a downlink subframe, particularly when both first and second access nodes utilize the same frequency band or sub-band.

At 402, the first access node is instructed to deploy wireless resources in the first frame configuration using a first frequency sub-band and additional wireless resources in the second frame configuration using a second frequency sub-band. Based on this instruction, the first access node may schedule the uplink-biased frame configuration on a primary carrier (utilizing the first frequency sub-band) and the downlink-biased frame configuration on a secondary carrier (utilizing the second frequency sub-band). The second access node may optionally (or already) be configured to schedule the downlink-biased frame configuration on one or more carriers utilizing both frequency sub-bands, or a single frequency sub-band. Further, step 402 is optional, in that the first access node may already be configured to deploy wireless resources in both frame configurations using both carriers respectively, with the potential for interference in step 401 being based on conflicting (or interfering) subframes of different types than those deployed by the second access node.

At 403, the first access node is instructed to remove resource assignments from one or more subframes deployed in the uplink-biased frame configuration using the first frequency sub-band, and to aggregate additional resources deployed in the downlink-biased frame configuration using the second frequency sub-band into the first frequency sub-band. In other words, resources from one or more downlink subframes scheduled in the secondary carrier are aggregated towards one or more uplink subframes scheduled in the primary carrier. In particular, the resources are aggregated towards the one or more uplink subframes for wireless devices that are attached to the first access node via the first primary carrier and that are capable of carrier aggregation. Aggregating resources from the second carrier enables the first access node to continue to serve said wireless devices connected thereto, while eliminating or minimizing interference that could be caused to downlink transmissions of wireless devices attached to the second access node by uplink transmissions of the wireless devices attached to the first access node.

In another exemplary embodiment, if the "new" frame configuration of the second access node is an uplink-biased frame configuration (such as, for instance, FC1), and the "old" frame configuration of the first access node is a downlink-biased frame configuration (such as, for instance, FC2), then the first access node is instructed to aggregate resources from the primary carrier towards the secondary carrier. In other words, step 403 is modified by aggregating resources from one or more uplink subframes scheduled in the uplink-biased frame configuration towards one or more downlink subframes scheduled in the downlink-biased frame configuration. The one or more uplink subframes are scheduled contemporaneously with the one or more downlink subframes. The resources are aggregated towards the one or more downlink subframes for wireless devices that are attached to the first access node via the secondary carrier. In further embodiments, presence of a threshold number of wireless devices in a potential interference zone between the first and second access nodes may be determined prior to performing operations 402 and 403. In additional embodiments, wireless device capabilities, traffic type, quality of service (QoS), etc. are factors in determining whether or not there is a potential for interference, and/or whether or not to perform carrier aggregation as described above.

Figure 5:
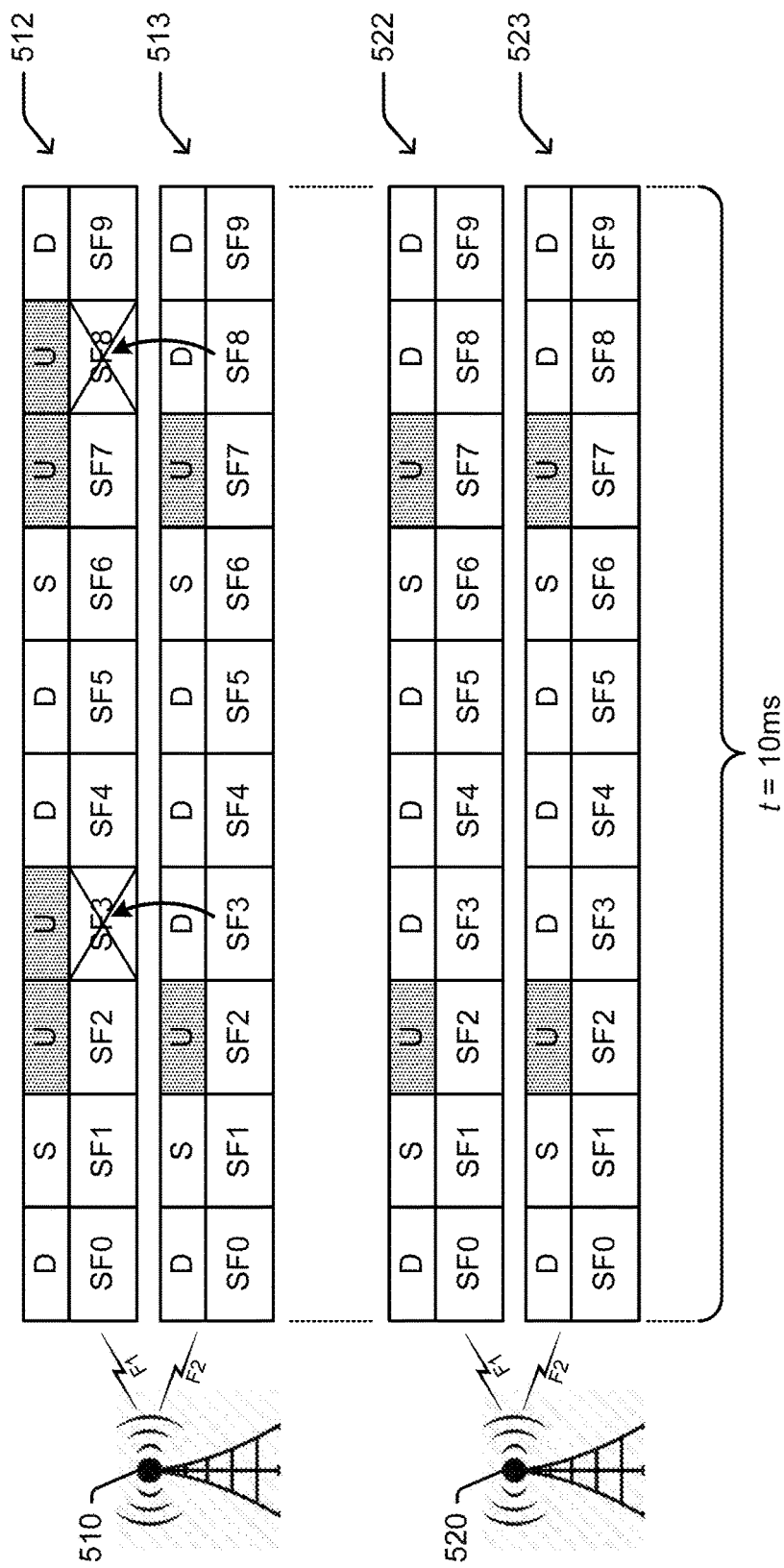
FIG. 5 depicts exemplary frame configurations deployed with carrier aggregation.

FIG. 5 depicts exemplary frame configurations deployed with carrier aggregation. As described herein, each frame configuration 512, 513, 522, and 522 is one of a plurality of frame configurations, and each frame configuration comprises a data frame having a sequence of uplink and downlink subframes in a specified ratio for a fixed time interval, along with one or more special subframes. A first access node 510 is configured to deploy wireless air-interface resources in at least a first frame configuration 512, depicted herein as an uplink-biased frame configuration, and comprising a first unique sequence of subframes SF0-SF9 within a frame interval of t=10 ms. A second access node 520 is configured to deploy wireless air-interface resources in a second frame configuration 522, 523 comprising a second unique sequence of subframes SF0-SF9 within a frame interval of t=10 ms. It will be appreciated that first frame configuration 512 corresponds to FC1 in Table 1 above, and second frame configuration 522, 523 corresponds to FC2. In other embodiments, the selected frame configuration comprises fewer downlink subframes relative to uplink subframes than the current frame configuration. For any number of reasons, frame configuration deployments may be selected having different ratios of uplink subframes relative to downlink subframes. For example, a network operator may have configured access node 520 to utilize frame configurations 522, 523 that comprise fewer uplink subframes relative to downlink subframes than existing frame configuration 512 utilized by access node 510, so that relatively greater downlink resources are available within the network.

Since the "new" frame configuration 522 comprises downlink subframes SF3 and SF8 that are of a different type than the contemporaneously-scheduled uplink subframes SF3 and SF8 in the "old" frame configuration 512, there exists a potential for interference for wireless devices attached to either of access nodes 510 and 520 and utilizing the same frequency sub-band, i.e. frequency sub-band F1. To minimize any potential interference, access node 510 is instructed to schedule the uplink-biased frame configuration 512 on the primary carrier F1 and downlink-biased frame configuration 513 on the secondary carrier F2. Further, second access node 520 is configured (or may already have been configured, if carrier aggregation is enabled) to schedule the downlink-biased frame configuration on both carriers F1 and F2. Subsequently, access node 510 is configured to aggregate the resources from subframes SF3 and SF8 deployed on the secondary carrier (F2) into corresponding (i.e. contemporaneously-scheduled) subframes SF3 and SF8 deployed in frame configuration 512 on primary carrier F1. In other words, resources are aggregated from downlink subframes scheduled in downlink-biased frame configuration 513 towards uplink subframes scheduled in uplink-biased frame configuration 512. The resources are aggregated towards the uplink subframes for wireless devices that are attached to access node 510 via the primary carrier. Consequently, said wireless devices attached to access node 510 via frequency sub-band F1 do not cause interference to nearby wireless devices that are attached to access node 520.

Further, access node 510 may be instructed to remove resource assignments from subframes SF3 and SF8 of frame configuration 512, effectively blanking or muting said subframes. For example, as described herein, any allocation of wireless air-interface resources is removed from uplink subframes SF3 and SF8 that may conflict with corresponding downlink subframes SF3 and SF8 deployed by access node 520 in frame configuration 522. Data and/or control interface resources are minimally-allocated or not allocated towards uplink subframes SF3 and SF8. Consequently, the potential for interference is minimized.

In alternate embodiments, if the network operator decides to provide more uplink resources in the network and configures access node 520 to use a "new" uplink-biased frame configuration (i.e. FC1), while access node 510 is configured with an "old" downlink-biased frame configuration (i.e. FC2), access node 510 may be instructed to schedule the downlink-biased frame configuration on a first carrier and aggregate resources from a second carrier towards downlink subframes in the downlink-biased frame configuration. In other words, uplink resources are aggregated towards the one or more downlink subframes for wireless devices that are attached to access node 510 via the primary carrier, thereby avoiding interference with nearby wireless devices attached to access node 520 and utilizing the same frequency sub-band.

FIG. 6 depicts an exemplary system 600 for modifying a frame configuration in a wireless network with at least three adjacent access nodes. Similar to system 100 depicted in FIG. 1, system 600 comprises a communication network 601, gateway 602, controller node 604, access nodes 610 and 620, and a number of end-user wireless devices such as wireless device 640. Access node 610 is illustrated as having a coverage area 615 and access node 620 is illustrate as having a coverage area 625. However, in this embodiment, a third access node 630 is depicted as being adjacent to access node 610, and has a coverage area 635. Wireless devices 640 are illustrated as being located within each of the three coverage areas 615, 625, 635, accessing network services directly from access nodes 610, 625, and 635 respectively. Moreover, certain numbers of wireless devices 640 are located in each of two potential interference zones 651 and 652. Interference zone 651 comprises an area where both coverage areas 615 and 625 overlap, and interference zone 652 comprises an area where both coverage areas 615 and 635 overlap.

As a consequence, if access node 610 is configured to deploy wireless air-interface resources (or subframes) in a frame configuration that is different from a frame configuration of wireless air-interface resources deployed by access node 620, then there may be interference caused to wireless devices located in interference zone 651 and share the same frequency sub-band. Similarly, if access node 610 is configured to deploy wireless air-interface resources (or subframes) in a frame configuration that is different from a frame configuration of wireless air-interface resources deployed by access node 630, then there may be interference caused to wireless devices located in interference zone 652 and share the same frequency sub-band. For example, access node 620 may be configured to utilize a "new" frame configuration, while access nodes 610 and 630 have not yet been configured to utilize the new frame configuration, and therefore utilize an "old" frame configuration. Consequently, wireless devices in interference zone 651 and utilizing the same frequency sub-band may be subject to interference caused by conflicting subframes (i.e. subframes of different types) as described herein. Since access nodes 610 and 630 are configured to deploy the same frame configuration, it is less likely that wireless devices in interference zone 652 are subject to interference, as there are no conflicting types of subframes. However, if access node 610 is configured to deploy both frame configurations using two frequency sub-bands or carriers (as described above), and aggregate resources from one sub-band towards the other to overcome the interference for wireless devices in interference zone 651, then the potential for interference shifts over to interference zone 652. In other words, access node 630 may deploy wireless resources in the "old" frame configuration using the second frequency sub-band, which causes additional potential for interference with wireless resources deployed by the access node 610 using the modified frame configuration as described above.

Figure 7:
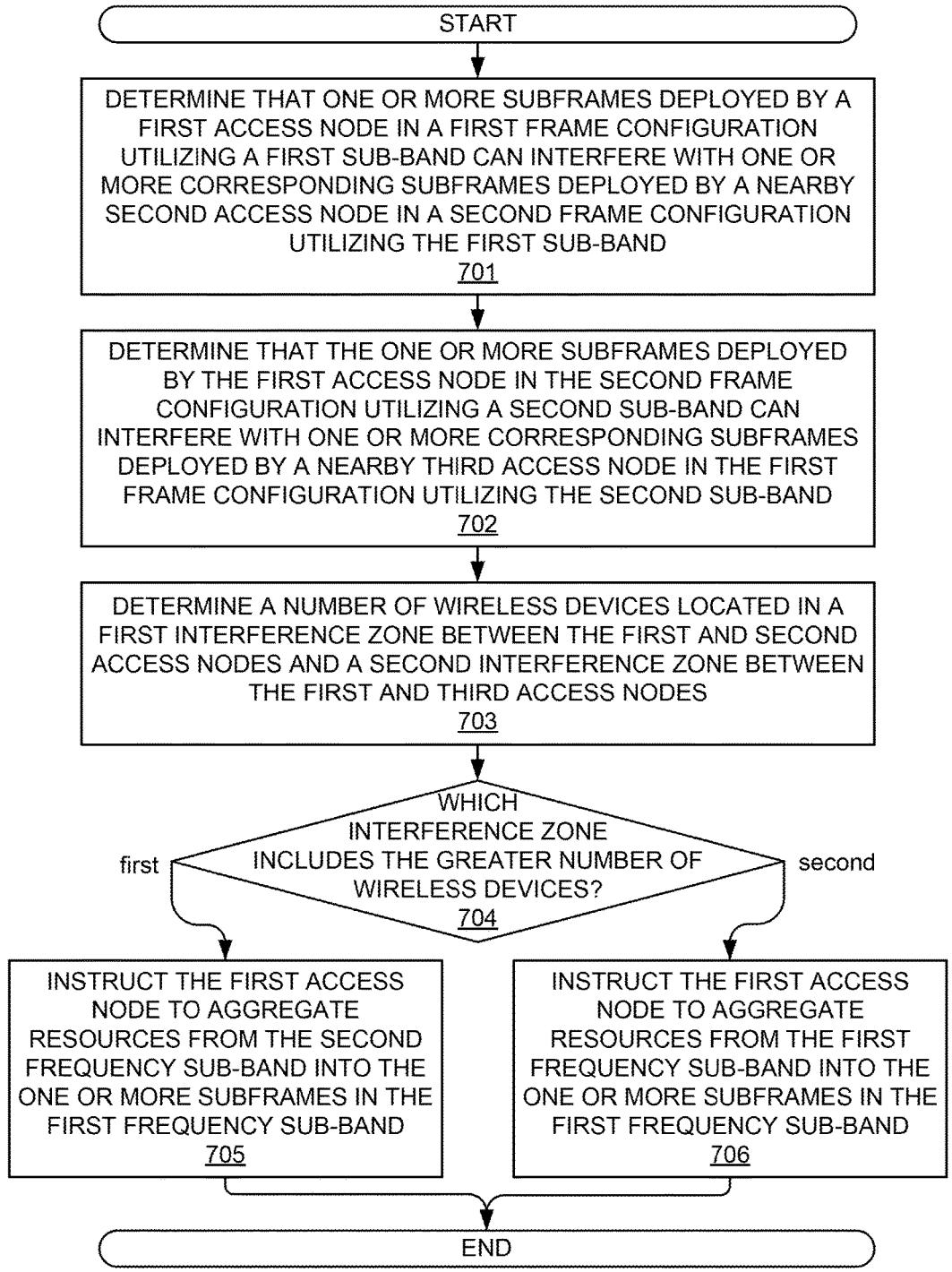
FIG. 7 depicts an exemplary method for modifying a frame configuration in a wireless network with at least three adjacent access nodes.
Figure 8A:
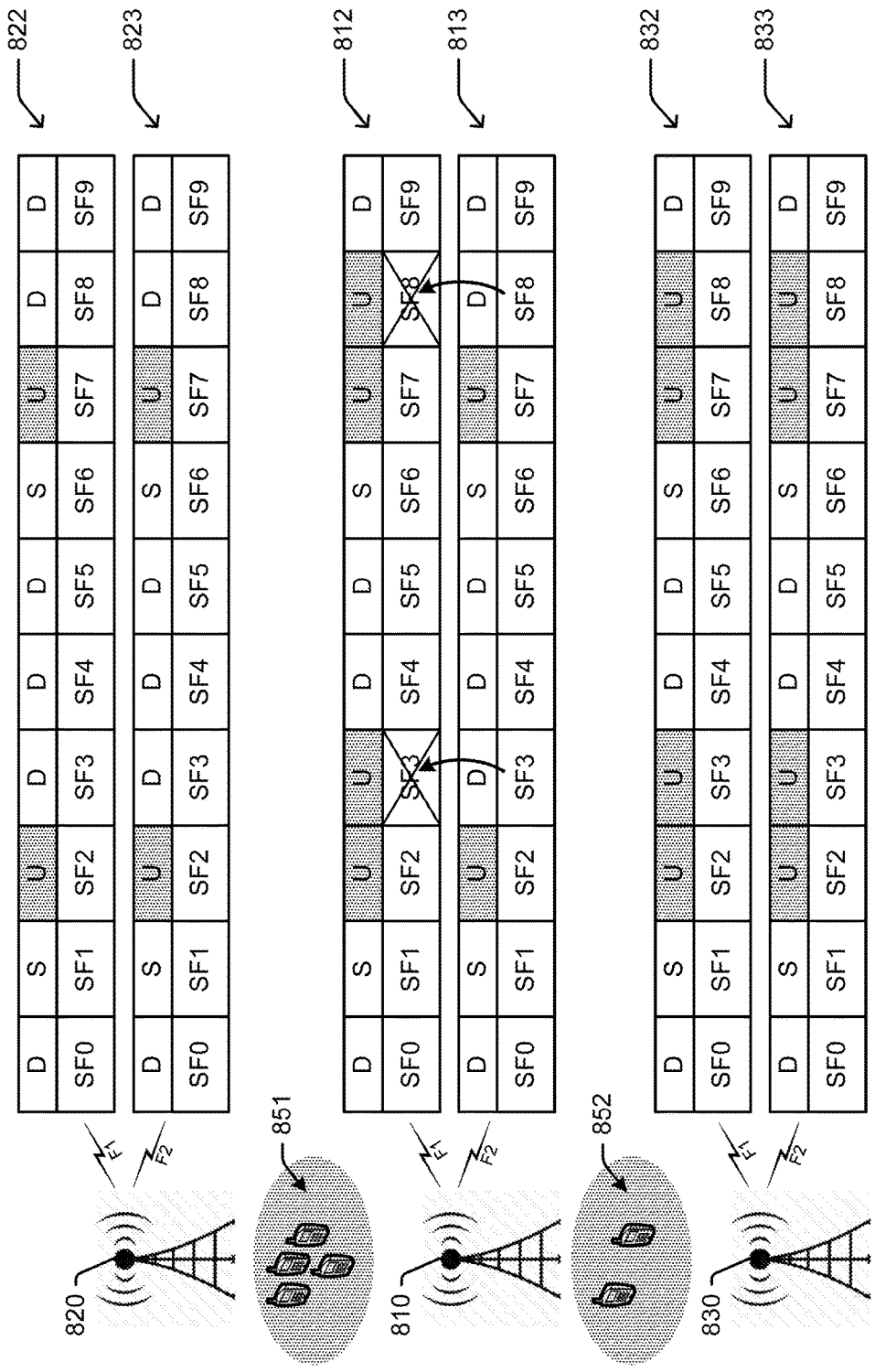
FIGS. 8A-8B depict exemplary modified frame configurations based on a number of wireless devices within interference zones.
Figure 8B:
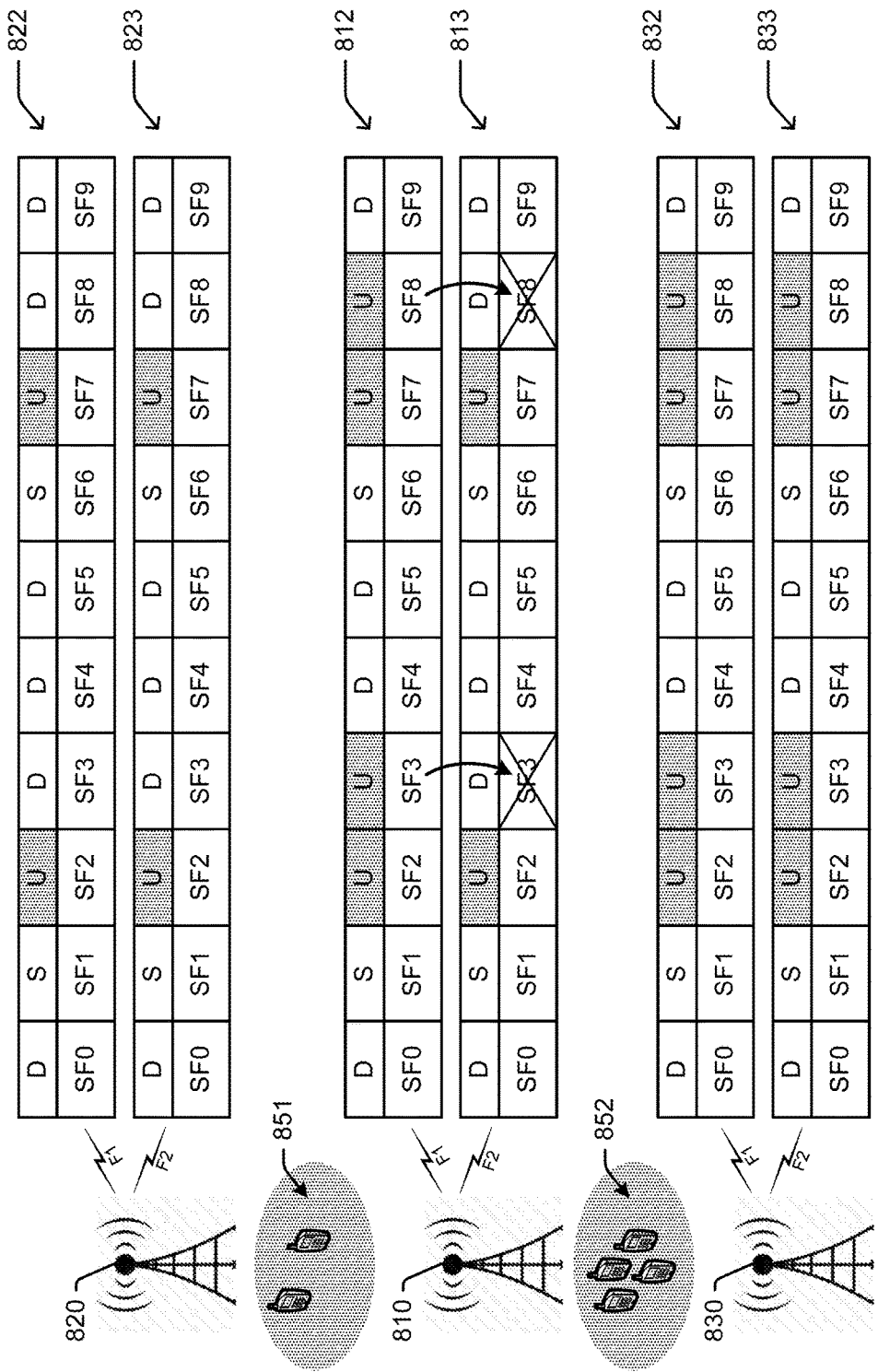

In particular, when access node 620 deploys the new frame configuration using two frequency sub-bands F1 and F2, access node 610 deploys the old frame configuration using frequency sub-band F1 and the new frame configuration using frequency sub-band F2, and access node 630 deploys the old frame configuration using both frequency sub-bands F1 and F2, it is helpful to determine how reconfiguration of access node 610 affects the potential for interference in both zones 651 and 652. In such a scenario, a decision of how to reconfigure access node 610 is based on a comparison of the numbers of wireless devices 640 in each of potential interference zones between each access node. For example, a determination is made of a first number of wireless devices located in first interference zone 651 between access nodes 610 and 620, and a second number of wireless devices located in a second interference zone 652 between access nodes 610 and 630. If the first number exceeds the second number, wireless resources from frequency sub-band F2 (i.e. the secondary carrier deployed by access node 610) are aggregated into interfering subframes deployed in the first frame configuration utilizing the first frequency sub-band F1 (i.e. the primary carrier deployed by access node 610) so as to avoid interference for wireless devices in interference zone 651. Conversely, if the second number exceeds the first number, wireless resources from the primary carrier are aggregated into interfering subframes deployed in the second frame configuration utilizing the secondary carrier, so as to avoid interference for wireless devices in interference zone 651. FIGS. 7 and 8A-8B depict these operations in further detail.

Meanwhile, the components of system 600 are similar to the components of system 100. For example, access nodes 610, 620, 630 can be any network node configured to provide communication between end-user wireless devices 640 and communication network 601, including standard access nodes and/or short range, low power, small access nodes. For instance, access nodes 610, 620, 630 may include any standard access node, such as a macrocell access node, base transceiver station, a radio base station, an eNodeB device, an enhanced eNodeB device, or the like. In an exemplary embodiment, a macrocell access node can have a coverage area 615, 625, 635 in the range of approximately five kilometers to thirty-five kilometers and an output power in the tens of watts. In other embodiments, access nodes 610, 620, 630 can be a small access node including a microcell access node, a picocell access node, a femtocell access node, or the like such as a home NodeB or a home eNodeB device. Moreover, it is noted that while access nodes 610, 620 are illustrated in FIG. 6, any number of access nodes can be implemented within system 600.

Access nodes 610, 620, 630 can comprise processors and associated circuitry to execute or direct the execution of computer-readable instructions to perform operations such as those further described herein. Briefly, access nodes 610, 620, 630 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 610, 620, 630 can each receive instructions and other input at a user interface. Access nodes 610, 620, 630 communicate with gateway node 602 and controller node 604 via communication links, and with each other using a direct link such as an X2 link or similar (not shown).

Wireless devices 640 may be any device, system, combination of devices, or other such communication platform capable of communicating wirelessly with access nodes 610, 620, 630 using one or more frequency sub-bands deployed therefrom, such as F1 and F2. Each of wireless devices 640 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 610, 620, 630. Other types of communication platforms are possible.

Communication network 601 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 601 can be capable of carrying data, for example, to support voice, push-to-talk, broadcast video, and data communications by wireless devices 640. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 601 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 601 can also comprise additional base stations, controller nodes, telephony switches, internet routers, network gateways, computer systems, communication links, or some other type of communication equipment, and combinations thereof.

Gateway node 602 can be any network node configured to interface with other network nodes using various protocols. Gateway node 602 can communicate user data over system

600. Gateway node 602 can be a standalone computing device, computing system, or network component, and can be accessible, for example, by a wired or wireless connection, or through an indirect connection such as through a computer network or communication network. For example, gateway node 602 can include a serving gateway (SGW) and/or a public data network gateway (PGW), etc. One of ordinary skill in the art would recognize that gateway node 602 is not limited to any specific technology architecture, such as Long Term Evolution (LTE) and can be used with any network architecture and/or protocol.

Gateway node 602 can comprise a processor and associated circuitry to execute or direct the execution of computer-readable instructions to obtain information. Gateway node 602 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 602 can receive instructions and other input at a user interface.

Controller node 604 can be any network node configured to communicate information and/or control information over system 600. Controller node 604 can be configured to transmit control information associated with a handover procedure. Controller node 604 can be a standalone computing device, computing system, or network component, and can be accessible, for example, by a wired or wireless connection, or through an indirect connection such as through a computer network or communication network. For example, controller node 604 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 604 is not limited to any specific technology architecture, such as Long Term Evolution (LTE) and can be used with any network architecture and/or protocol.

Controller node 604 can comprise a processor and associated circuitry to execute or direct the execution of computer-readable instructions to obtain information. Controller node 604 can retrieve and execute software from storage, which can include a disk drive, a flash drive, memory circuitry, or some other memory device, and which can be local or remotely accessible. In an exemplary embodiment, controller node 604 includes a database 605 for storing wireless device capabilities of wireless devices 640 such as carrier-aggregation capabilities, locations thereof, frame configurations of access nodes 610, 620, 630 as well as predefined or dynamic thresholds and associations thereof with frame configurations, and so on. This information may be requested by or shared with access nodes 610, 620, 630 via communication links such as X2 connections and so on. The software comprises computer programs, firmware, or some other form of machine-readable instructions, and may include an operating system, utilities, drivers, network interfaces, applications, or some other type of software, and combinations thereof. Controller node 604 can receive instructions and other input at a user interface.

Other network elements may be present in system 600 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 610, 620, 630 and communication network 601.

FIG. 7 depicts an exemplary method for modifying a frame configuration in a wireless network with at least three adjacent access nodes. The method of FIG. 7 may be implemented by an access node, such as one or more of access nodes 610, 620, 630 in FIG. 6, controller node 604, or any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The method begins, at 701, with a determination that one or more subframes deployed by a first access node in a first frame configuration utilizing a first sub-band can interfere with one or more corresponding subframes deployed by a nearby second access node in a second frame configuration utilizing the first sub-band. For example, the wireless resources deployed by the first access node in the first frame configuration may be deployed using a first frequency sub-band, and additional wireless resources deployed the second frame configuration using a second frequency sub-band. In other words, the first access node deploys a primary carrier utilizing the first frequency sub-band and a secondary carrier utilizing the second frequency sub-band, and the second access node deploys a primary carrier utilizing both first and second frequency sub-bands. For any number of reasons, frame configuration deployments may be selected having different ratios of uplink subframes relative to downlink subframes. For example, a network operator may have configured the second access node to utilize a "new" frame configuration comprising fewer uplink subframes relative to downlink subframes than an existing or "old" frame configuration utilized by the first access node so that relatively greater downlink resources are available within the network. Since the "new" frame configuration comprises downlink subframes that are contemporaneously scheduled with uplink subframes in the "old" frame configuration, there exists a potential for interference for wireless devices within an interference zone in between each access node and utilizing the same frequency sub-band.

Similarly, at 702, it is determined that one or more subframes deployed by the first access node in the second frame configuration utilizing the second frequency sub-band can interfere with one or more corresponding subframes deployed by a nearby third access node in the first (i.e. old) frame configuration utilizing the second sub-band. For example, the third access node may be configured to deploy the old frame configuration using both frequency sub-bands or carriers. This results in an additional potential for interference between a first type of subframe (such as, for instance, a downlink subframe) deployed by the first access node in the new frame configuration using the second frequency sub-band, and a second type of subframe (such as, for instance, an uplink subframe) deployed by the third access node in the old frame configuration using the second frequency sub-band.

At 703, a determination is made of a first number of wireless devices located in a first interference zone between the first and second access nodes and a second number of wireless devices located in a second interference zone between the first and third access nodes. The first and second numbers are compared at 704. Such a comparison is helpful in determining how reconfiguration of the first access node affects the potential for interference in both zones. For example, if a determination is made at 704 that the first number exceeds the second number, then at 705, the first access node is instructed to aggregate wireless resources from the secondary carrier into interfering subframes deployed in the first frame configuration utilizing the first frequency sub-band, as described above with reference to FIGS. 4 and 5, thereby avoiding interference for wireless devices in the first interference zone. Conversely, if the second number exceeds the first number, then at 706, the first access node is instructed to aggregate wireless resources from the primary carrier into interfering subframes deployed in the second frame configuration utilizing the secondary carrier, so as to avoid interference for wireless devices in the second interference zone.

FIGS. 8A-8B depict exemplary modified frame configurations based on a number of wireless devices within interference zones. Both FIGS. 8A and 8B depict access nodes 810, 820, and 830 configured to deploy wireless air-interface resources using two frequency sub-bands F1 and F2, thereby enabling carrier-aggregation for wireless devices that are capable of such features. Further, first access node 810 is configured to deploy wireless air-interface resources in at least a first frame configuration 812, depicted herein as an uplink-biased frame configuration, and comprising a first unique sequence of subframes SF0-SF9 within a frame interval of t=10 ms, and a second frame configuration 813, depicted herein as a downlink-biased frame configuration, and comprising a second unique sequence of subframe SF0-SF9 within the same frame interval. A second access node 820 is configured to deploy subframes SF0-SF9 in the second frame configuration 822, 823 utilizing both frequency sub-bands F1 and F2 respectively. Finally, a third access node 830 is configured to deploy wireless air-interface resources in the first frame configuration 832, 833 utilizing both frequency sub-bands F1 and F2 respectively. It will be appreciated that the first frame configuration 812, 832, 833 corresponds to FC1 in Table 1 above, and the second frame configuration 813, 822, 823 corresponds to FC2. Moreover, the first frame configuration comprises fewer downlink subframes relative to uplink subframes than the second frame configuration. Thus, a network operator may have decided to configure all access nodes within the wireless network to switch to the second (i.e. "new") frame configuration that comprises more downlink subframes relative to uplink subframes, and such a transition is currently under way, starting with access node 820.

As described above, since the new frame configuration comprises downlink subframes SF3 and SF8 that are of a different type than the contemporaneously-scheduled uplink subframes SF3 and SF8 in the "old" frame configuration, there exists a potential for interference for wireless devices in potential interference zones 851 and 852 that utilize the same frequency sub-band. For example, wireless devices in interference zone 851 may experience interference between uplink subframes SF3, SF8 of frame configuration 812 utilizing frequency sub-band F1, and corresponding downlink subframes SF3, SF8 of frame configuration 822 also utilizing frequency sub-band F1. Similarly, wireless devices in interference zone 852 may experience interference between uplink subframes SF3, SF8 of frame configuration 813 utilizing frequency sub-band F2, and corresponding downlink subframes SF3, SF8 of frame configuration 833 also utilizing frequency sub-band F2.

Moreover, if access node 810 is configured to aggregate wireless resources from downlink subframes in frame configuration 813 towards uplink subframes in frame configuration 812, then the potential for interference with wireless devices in interference zone 851 utilizing frequency sub-band F1 is reduced, but the potential for interference with wireless devices in interference zone 852 utilizing both frequency sub-bands F1 and F2 in increased. Conversely (and as shown in FIG. 8B), if access node 810 is configured to aggregate wireless resources from uplink subframes in frame configuration 812 towards uplink subframes in frame configuration 812, then the potential for interference with wireless devices in interference zone 851 utilizing frequency sub-band F1 is reduced, but the potential for interference with wireless devices in interference zone 852 utilizing both frequency sub-bands F1 and F2 in increased.

Therefore, a determination of numbers of wireless devices in each of interference zones 851 and 852 is useful in determining how to aggregate resources in access node 810. FIG. 8A depicts a scenario where a greater number of wireless devices in potential interference zone 851 between access nodes 810 and 820 triggers carrier aggregation from subframes deployed in new frame configuration 813 towards subframes deployed in old frame configuration 812, and FIG. 8B depicts a scenario where a greater number of wireless devices in potential interference zone 852 between access nodes 810 and 830 triggers carrier aggregation from subframes deployed in old frame configuration 812 towards subframes deployed in new frame configuration 813.

Thus, referring to FIG. 8A, access node 810 is instructed to aggregate the resources from subframes SF3 and SF8 deployed in frame configuration 813 using the secondary carrier (F2) into corresponding (i.e. contemporaneously-scheduled) subframes SF3 and SF8 deployed in frame configuration 812 on the primary carrier F1. The resources are aggregated towards the uplink subframes for wireless devices that are attached to access node 810 via the primary carrier. Consequently, said wireless devices attached to access node 810 via frequency sub-band F1 do not cause interference to nearby wireless devices that are attached to access node 820. Further, access node 810 may be instructed to remove resource assignments from uplink subframes SF3 and SF8 of frame configuration 812, effectively blanking or muting said uplink subframes. For example, as described herein, any allocation of wireless air-interface resources is removed from uplink subframes SF3 and SF8 that may conflict with corresponding downlink subframes SF3 and SF8 deployed by access node 820 in frame configuration 822. Data and/or control interface resources are minimally-allocated or not allocated towards uplink subframes SF3 and SF8. Consequently, the potential for interference is minimized.

Referring now to FIG. 8B, it may be determined that a greater number of wireless devices exists in potential interference zone 852 between access nodes 810 and 830 than in potential interference zone 851, as described in FIG. 8A. Such a determination triggers carrier aggregation from subframes deployed in old frame configuration 812 towards subframes deployed in new frame configuration 813. For example, in this scenario, access node 810 is instructed to aggregate the resources from subframes SF3 and SF8 deployed in frame configuration 812 using the primary carrier (F1) into corresponding (i.e. contemporaneously-scheduled) subframes SF3 and SF8 deployed in frame configuration 813 on the secondary carrier F2. The resources are aggregated towards the downlink subframes for wireless devices that are attached to access node 810 via the secondary carrier. Consequently, said wireless devices attached to access node 810 via frequency sub-band F2 do not cause interference to nearby wireless devices that are attached to access node 830. Further, access node 810 may be instructed to remove resource assignments from downlink subframes SF3 and SF8 of frame configuration 813, effectively blanking or muting said downlink subframes. For example, as described herein, any allocation of wireless air-interface resources is removed from downlink subframes SF3 and SF8 that may conflict with corresponding uplink subframes SF3 and SF8 deployed by access node 830 in frame configuration 833. Data and/or control interface resources are minimally-allocated or not allocated towards uplink subframes SF3 and SF8. Consequently, the potential for interference is minimized.

In alternate embodiments, a network operator may decide to provide more uplink resources in the network and configures access node 820 to use a "new" uplink-biased frame configuration (i.e. FC1), while access nodes 810 and 830 are still configured with the "old" downlink-biased frame configuration (i.e. FC2). In this case, if there are more wireless devices in interference zone 851, then access node 810 may be instructed to aggregate resources in the reverse direction as shown in FIG. 8A, i.e. from uplink subframes deployed using a second carrier towards downlink subframes deployed using the first carrier, thereby avoiding interference with nearby wireless devices attached to access node 820 and utilizing the same frequency sub-band. Similarly, if there are more wireless devices in interference zone 852, then access node 810 may be instructed to aggregate resources in the reverse direction as shown in FIG. 8B, i.e. from downlink subframes deployed using a first carrier towards uplink subframes deployed using the second carrier, thereby avoiding interference with nearby wireless devices attached to access node 830 and utilizing the same frequency sub-band. In additional embodiments, wireless device capabilities, traffic type, quality of service (QoS), etc. are factors in determining whether or not there is a potential for interference, and/or whether or not to perform carrier aggregation as described above. For example, if there are greater numbers of relay-capable wireless devices, or wireless devices utilizing a guaranteed bit rate (GBR), then the potential interference determination and/or carrier aggregation is performed based on these additional factors.

Figure 9:
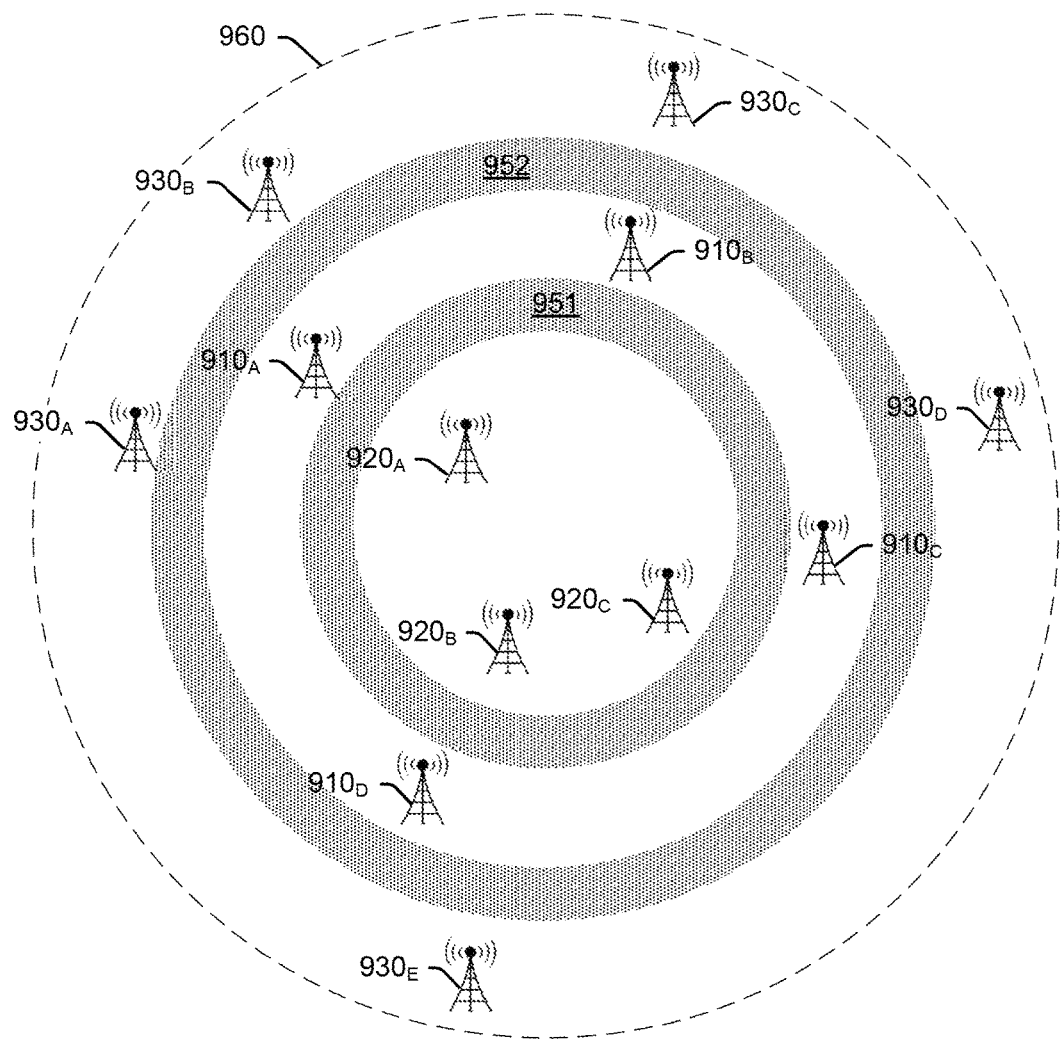
FIG. 9 depicts an exemplary system for deploying a modified frame configuration in a wireless network with multiple access nodes.

FIG. 9 depicts an exemplary system for deploying a modified frame configuration in a wireless network with multiple access nodes. As described herein, a network operator may decide to implement a downlink-biased frame configuration (such as, for instance, FC2) throughout the wireless network, so that relatively greater downlink resources are available within the network. Thus, FIG. 9 depicts a wireless network 960 comprising access nodes $920_{A,B,C}$ utilizing the "new" (i.e. downlink-biased) frame configuration, access nodes $910_{A,B,C,D}$ in transition from the old (i.e. uplink-biased) to the new frame configuration, and access nodes $930_{A,B,C,D,E}$ still utilizing the old frame configuration. In other words, access nodes $910_{A,B,C,D}$ are shown as being located in between access nodes $920_{A,B,C}$ utilizing the new frame configuration and access nodes $930_{A,B,C,D,E}$ utilizing the old frame configuration. Thus, access nodes $910_{A,B,C,D}$ are instructed to modify their frame configurations based on a comparison of a first number of wireless devices in potential interference zone 951 (between access nodes $910_{A,B,C,D}$ and access nodes $920_{A,B,C}$) and a second number of wireless devices in potential interference zone 952 (between access nodes $910_{A,B,C,D}$ and access nodes $930_{A,B,C,D,E}$). Depending on which number is greater, access nodes $910_{A,B,C,D}$ are configured per the operations described in FIGS. 7 and 8A-8B.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication systems 100, 600 may be, comprise, or include computers systems and/or processing nodes. This includes, but is not limited to: access nodes 110, 120, 610, 620, 630, controller nodes 104, 604 and/or networks 101, 601.

Figure 10:
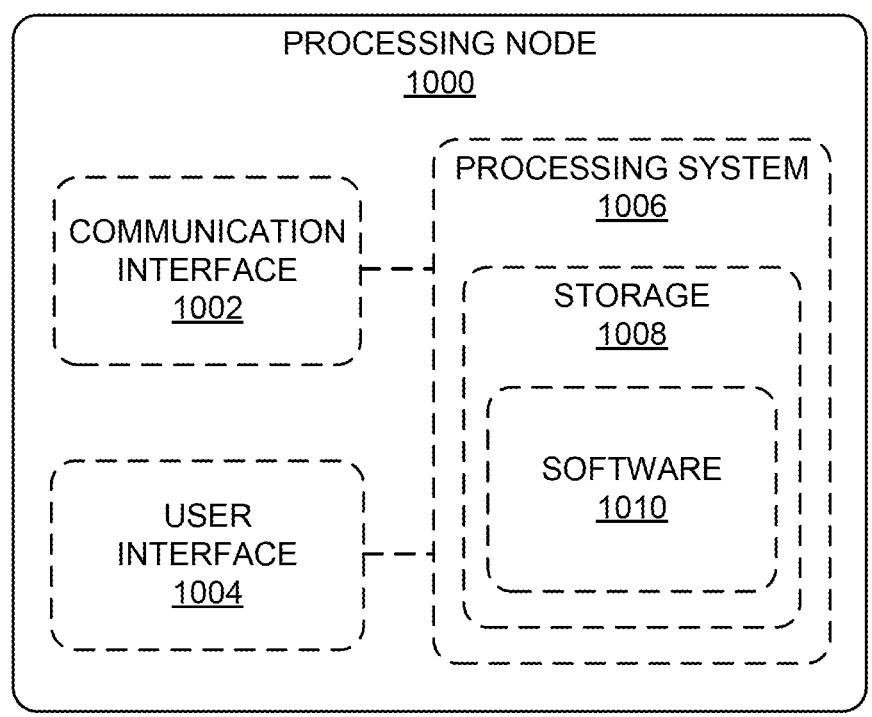
FIG. 10 depicts an exemplary processing node for data transmission using frame reconfiguration.

FIG. 10 depicts an exemplary processing node 1000 for data transmission using frame reconfiguration. Processing node 1000 comprises a communication interface 1002, user interface 1004, and processing system 1006 in communication with communication interface 1002 and user interface 1004. Processing system 1006 includes storage 1008, which can comprise a disk drive, flash drive, memory circuitry, or other memory device. Storage 1008 can store software 1010 which is used in the operation of the processing node 1000. Storage 1008 may include a disk drive, flash drive, data storage circuitry, or some other memory apparatus. For example, storage 1008 may include a buffer. Software 1010 may include computer programs, firmware, or some other form of machine-readable instructions, including an operating system, utilities, drivers, network interfaces, applications, or some other type of software. For example, software 1010 may include a scheduler module. Processing system 1006 may include a microprocessor and other circuitry to retrieve and execute software 1010 from storage 1008. Processing node 1000 may further include other components such as a power management unit, a control interface unit, etc., which are omitted for clarity. Communication interface 1002 permits processing node 1000 to communicate with other network elements. User interface 1004 permits the configuration and control of the operation of processing node 1000.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for frame reconfiguration in a wireless network, the system comprising:
a processing node; and
a processor coupled to the processing node, the processor for enabling the processing node to perform operations comprising:
determining that a first plurality of wireless devices is located in a first interference zone between a first access node and a second access node, wherein the first access node deploys a first primary carrier utilizing a first frequency sub-band and a first secondary carrier utilizing a second frequency sub-band and the second access node deploys at least a second primary carrier utilizing the second frequency sub-band;
determining that a second plurality of wireless devices is located in a second interference zone between the first access node and a third access node, wherein the third access node deploys at least a third primary carrier utilizing the first frequency sub-band;
determining that a first number of wireless devices in the first plurality of wireless devices exceeds a second number of wireless devices in the second plurality of wireless devices; and
aggregating resources from the first secondary carrier towards the first primary carrier.

2. The system of claim 1, wherein:
the first access node is configured to schedule an uplink-biased frame configuration on the first primary carrier and a downlink-biased frame configuration on the first secondary carrier,
the second access node is configured to schedule the downlink-biased frame configuration on the second primary carrier,
the third access node is configured to schedule the uplink-biased frame configuration on the third primary carrier, and
the uplink-biased frame configuration comprises a greater ratio of uplink subframes relative to downlink subframes than the downlink-biased frame configuration.

3. The system of claim 2, wherein:
aggregating the resources from the first secondary carrier towards the first primary carrier comprises aggregating resources from one or more downlink subframes scheduled in the downlink-biased frame configuration towards one or more uplink subframes scheduled in the uplink-biased frame configuration, and
the one or more downlink subframes are scheduled contemporaneously with the one or more uplink subframes.

4. The system of claim 3, wherein the resources are aggregated towards the one or more uplink subframes for wireless devices that are attached to the first access node via the first primary carrier.

5. The system of claim 2, wherein the operations further comprise:
determining that the second number exceeds the first number; and
aggregating resources from the first primary carrier towards the first secondary carrier.

6. The system of claim 5, wherein:
aggregating the resources from the first primary carrier towards the first secondary carrier comprises aggregating resources from one or more uplink subframes scheduled in the uplink-biased frame configuration towards one or more downlink subframes scheduled in the downlink-biased frame configuration, and
the one or more uplink subframes are scheduled contemporaneously with the one or more downlink subframes.

7. The system of claim 6, wherein the resources are aggregated towards the one or more downlink subframes for wireless devices that are attached to the first access node via the first secondary carrier.

8. A method for frame reconfiguration in a wireless network, the method comprising:
determining that a first plurality of wireless devices is located in a first interference zone between a first access node and a second access node, wherein the first access node deploys a first primary carrier utilizing a first frequency sub-band and a first secondary carrier utilizing a second frequency sub-band and the second access node deploys at least a second primary carrier utilizing the second frequency sub-band;
determining that a second plurality of wireless devices is located in a second interference zone between the first access node and a third access node, wherein the third access node deploys at least a third primary carrier utilizing the first frequency sub-band;
determining that a first number of wireless devices in the first plurality of wireless devices exceeds a second number of wireless devices in the second plurality of wireless devices; and
aggregating resources from the first secondary carrier towards the first primary carrier.

9. The method of claim 8, wherein:
the first access node is configured to schedule an uplink-biased frame configuration on the first primary carrier and a downlink-biased frame configuration on the first secondary carrier,
the second access node is configured to schedule the downlink-biased frame configuration on the second primary carrier,
the third access node is configured to schedule the uplink-biased frame configuration on the third primary carrier, and
the uplink-biased frame configuration comprises a greater ratio of uplink subframes relative to downlink subframes than the downlink-biased frame configuration.

10. The method of claim 9, wherein:
aggregating the resources from the first secondary carrier towards the first primary carrier comprises aggregating resources from one or more downlink subframes scheduled in the downlink-biased frame configuration towards one or more uplink subframes scheduled in the uplink-biased frame configuration, and
the one or more downlink subframes are scheduled contemporaneously with the one or more uplink subframes.

11. The method of claim 10, wherein the resources are aggregated towards the one or more uplink subframes for wireless devices that are attached to the first access node via the first primary carrier.

12. The method of claim 9, further comprising:
determining that the second number exceeds the first number; and
aggregating resources from the first primary carrier towards the first secondary carrier.

13. The method of claim 12, wherein:
aggregating the resources from the first primary carrier towards the first secondary carrier comprises aggregating resources from one or more uplink subframes scheduled in the uplink-biased frame configuration towards one or more downlink subframes scheduled in the downlink-biased frame configuration, and
the one or more uplink subframes are scheduled contemporaneously with the one or more downlink subframes.

14. The method of claim 13, wherein the resources are aggregated towards the one or more downlink subframes for wireless devices that are attached to the first access node via the first secondary carrier.

\* \* \* \* \*